(12) United States Patent
Viehmann et al.

(10) Patent No.: US 6,937,058 B2
(45) Date of Patent: Aug. 30, 2005

(54) METHODS AND APPARATUS FOR ACTIVE TERMINATION OF HIGH-FREQUENCY SIGNALS

(75) Inventors: Hans-Heinrich Viehmann, South Burlington, VT (US); Oliver Kiehl, Charlotte, VT (US)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/620,989

(22) Filed: Jul. 16, 2003

(65) Prior Publication Data

US 2005/0012519 A1 Jan. 20, 2005

(51) Int. Cl.[7] ................................................ H03K 17/16
(52) U.S. Cl. .......................................... 326/30; 326/83
(58) Field of Search ............................. 326/26, 27, 30, 326/82–86, 89

(56) References Cited

U.S. PATENT DOCUMENTS

| | | | |
|---|---|---|---|
| 3,937,988 A | 2/1976 | DeClue et al. | |
| 5,361,005 A * | 11/1994 | Slattery et al. | 326/56 |
| 5,467,455 A * | 11/1995 | Gay et al. | 710/100 |
| 6,100,713 A | 8/2000 | Kalb et al. | |
| 6,323,675 B1 | 11/2001 | Whitworth et al. | |
| 6,351,138 B1 | 2/2002 | Wong | |
| 6,642,741 B2 * | 11/2003 | Metz et al. | 326/30 |
| 6,720,795 B2 * | 4/2004 | Partow et al. | 326/30 |

* cited by examiner

*Primary Examiner*—Don Le
(74) *Attorney, Agent, or Firm*—Slater & Matsil, L.L.P.

(57) ABSTRACT

An integrated circuit, comprising: at least one main circuit operable to perform one or more functions, and including at least one I/O node for receiving or transmitting an operating signal; an active termination circuit having first and second MOSFETs of the same type coupled in series across a Vdd node of a first source potential and a Vss node of a second source potential, the at least one I/O node being coupled to a common node between the first and second MOSFETs; and a control circuit operable to bias the first and second MOSFETs such that they exhibit a controlled impedance at the common node.

31 Claims, 11 Drawing Sheets

METHODS AND APPARATUS FOR ACTIVE TERMINATION OF HIGH-FREQUENCY SIGNALS

BACKGROUND OF THE INVENTION

The present invention relates to methods and apparatus for providing a termination function that exhibits a controlled impedance to terminate a signal, such as may be used in an integrated circuit or the like.

Proper termination of high-frequency signals are of particular concern in the design and implementation of electronic circuits, such as digital computers, microprocessors, digital signal processors, memory circuits, or virtually any other electronic circuit in which impedance matching is important. Indeed, if the impedance of a receiving or transmitting circuit is not properly controlled, then undesired transmission line effects may result, such as undesirable signal reflections. Signal reflections are of particular concern in high-frequency applications, such as in digital circuits, where signal reflections may result in unwanted interference with an incident or received signal that result in an erroneous logic level.

Figure 1:
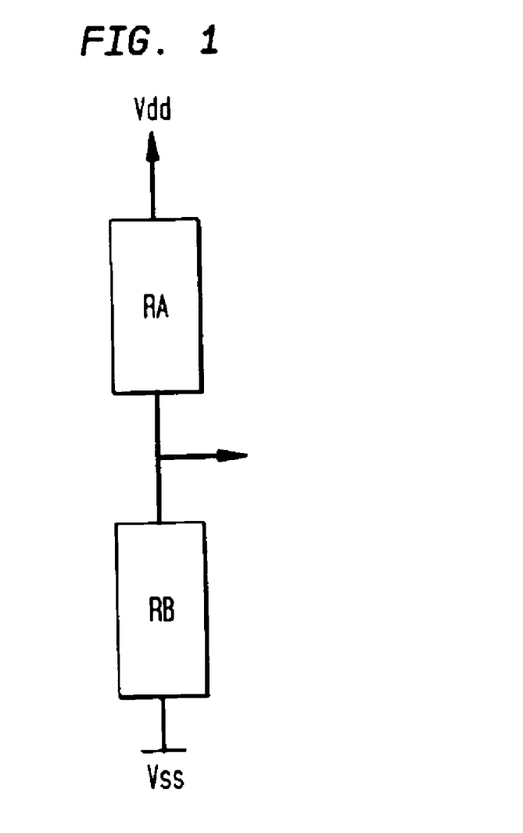
FIG. 1 illustrates a circuit diagram of a conventional termination circuit.

A prior art technique of providing a termination of a desirable impedance is illustrated in FIG. 1. In particular, FIG. 1 illustrates a termination circuit 10 employing a resistor divider comprising a first resistor RA and a second resistor RB coupled in series across voltage sources Vdd and Vss. With this configuration, the impedance at the termination node is approximately equal to the parallel combination of RA and RB. The values of RA and RB are selected in order to achieve a desirable impedance, thereby reducing or eliminating unwanted signal reflections. Among the disadvantages of this prior art resistor-termination approach is relatively high cross current and attendant power dissipation.

Figure 2:
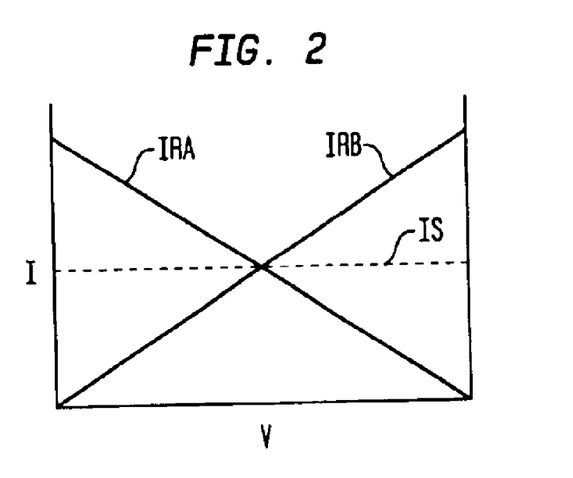
FIG. 2 is a graph illustrating the voltage and current characteristics of the circuit components of FIG. 1.

The power consumption and dissipation characteristics of the resistor-termination approach will be discussed with reference to FIG. 2. FIG. 2 illustrates the current I and voltage V characteristics of the respective resistors RA and RB. The voltage V along the abscissa of the illustrated graph represents a voltage induced on the termination node of the termination circuit 10 of FIG. 1. The induced voltage may be produced by a driver circuit that operates to produce a logic high level or a logic low level. For example, the driver circuit might output a logic high level by placing a voltage approaching Vdd on the termination node. Alternatively, the driver circuit might operate to produce a logic low level by placing a voltage approaching Vss on the termination node. The voltage placed on the termination node by the driver circuit affects the current characteristics of the resistors RA and RB. Assuming that RA and RB are substantially equal to one another, then the currents IRA and IRB through RA and RB, respectively, intersect one another at a voltage of about (Vdd−Vss)/2.

As the voltage V at the termination node is reduced by the driver circuit, the current IRA through resistor RA increases (due to an increase in the voltage thereacross) and the current IRB through resistor RB reduces (due to a reduction in the voltage thereacross). The summation of the currents IRA and IRB is substantially equal to the shunt current Is drawn by the termination circuit 10. Depending on the values of Vdd, Vss, RA and RB, the magnitude of the shunt current Is may be on the order of about 10 mA. This is a relatively high value.

Accordingly, there are needs in the art for new methods and apparatus for terminating a signal that do not draw excessive current from a power supply, yet provide a controlled impedance in order to reduce or eliminate signal reflections.

SUMMARY OF THE INVENTION

In accordance with one or more aspects of the present invention, an integrated circuit includes: at least one main circuit operable to perform one or more functions, and including at least one I/O node for receiving or transmitting an operating signal; an active termination circuit having first and second MOSFETs of the same type coupled in series across a Vdd node of a first source potential and a Vss node of a second source potential, the at least one I/O node being coupled to a common node between the first and second MOSFETs; and a control circuit operable to bias the first and second MOSFETs such that they exhibit a controlled impedance at the common node.

The first and second MOSFETs may be of the N-channel type or of the P-channel type.

The control circuit preferably includes a first gate control circuit operable to provide a first gate drive signal to a gate of the first MOSFET, and a second gate control circuit operable to provide a second gate drive signal to a gate of the second MOSFET. The first and second gate drive signals are preferably produced such that a quiescent voltage potential of the common node is between the Vdd and Vss potentials. The quiescent voltage potential of the common node may be at about a midpoint between the Vdd and Vss potentials. The quiescent voltage potential of the common node is preferably substantially non-zero.

The first gate control circuit preferably includes a first impedance coupled between the gate and a drain of the first MOSFET and a first current source coupled from the gate of the first MOSFET to the Vss node. The second control circuit preferably includes a second impedance coupled between the gate and a drain of the second MOSFET and a second current source coupled from the gate of the second MOSFET to the Vss node.

The control circuit may include a third current source coupled between the Vdd node and the common node. Respective magnitudes of the first, second, and third current sources are preferably controlled to achieve the controlled impedance and the quiescent voltage potential at the common node.

The first, second, and third current sources may be voltage controllable and produce respective currents in response to a current command signal to achieve the controlled impedance and the quiescent voltage potential at the common node. In this regard, the control circuit further includes a scaled MOSFET coupled in series with a fourth current source from the Vdd node to the Vss node, a third impedance coupled from a drain to a gate of the scaled MOSFET, a fifth voltage controlled current source receiving the current command signal and being coupled from the gate of the scaled MOSFET to the Vss node, and an operational amplifier operable to produce the current command signal based on a reference voltage and a voltage at a source of the scaled MOSFET.

Preferably, a ratio of the magnitude of the reference voltage and the magnitude of the fourth current source is substantially the controlled impedance at the common node. The scaled MOSFET may be a scaled version of the first MOSFET. The control circuit preferably includes a voltage source operable to produce about ½ of the voltage potential between the Vdd and Vss nodes, and a reference resistor coupled from the voltage source to a sixth current source.

The reference voltage is preferably taken at a junction of the reference resistor and the sixth current source.

In accordance with one or more further aspects of the present invention, an active signal termination circuit includes: a first N-channel MOSFET having a gate terminal, a drain terminal, a source terminal, and a bulk terminal, the source terminal and the bulk terminal being coupled to a common node, and the drain terminal being coupled to a Vdd node of a first source potential; a second N-channel MOSFET having a gate terminal, a drain terminal, a source terminal, and a bulk terminal, the source terminal and the bulk terminal being coupled to a Vss node of a second source potential, and the drain terminal being coupled to the common node; and a control circuit operable to bias the first and second MOSFETs such that they exhibit a controlled impedance at the common node.

In accordance with one or more further aspects of the present invention, an active signal termination circuit includes: a first P-channel MOSFET having a gate terminal, a drain terminal, a source terminal, and a bulk terminal, the drain terminal and the bulk terminal being coupled to a Vdd node of a first source potential, and the source terminal being coupled to a common node; a second P-channel MOSFET having a gate terminal, a drain terminal, a source terminal, and a bulk terminal, the drain terminal and the bulk terminal being coupled to the common node, and the source terminal being coupled to a Vss node of a second source potential; and a control circuit operable to bias the first and second MOSFETs such that they exhibit a controlled impedance at the common node.

In accordance with one or more further aspects of the present invention, a method includes biasing first and second series coupled MOSFETs of the same type such that they exhibit a controlled impedance at a common node thereof, wherein the first and second MOSFETs are coupled in series across a Vdd node of a first source potential and a Vss node of a second source potential, the common node being between the first and second MOSFETs.

Other aspects, features, and advantages of the invention will become apparent to one skilled in the art when the description herein is taken in conjunction with the accompanying drawings.

BRIEF DESCRIPTION OF THE DRAWINGS

For the purposes of illustrating the invention, there are shown in the drawings forms that are presently preferred, it being understood, however, that the invention is not limited to the precise arrangements and instrumentalities shown.

DETAILED DESCRIPTION OF THE INVENTION

Figure 3:
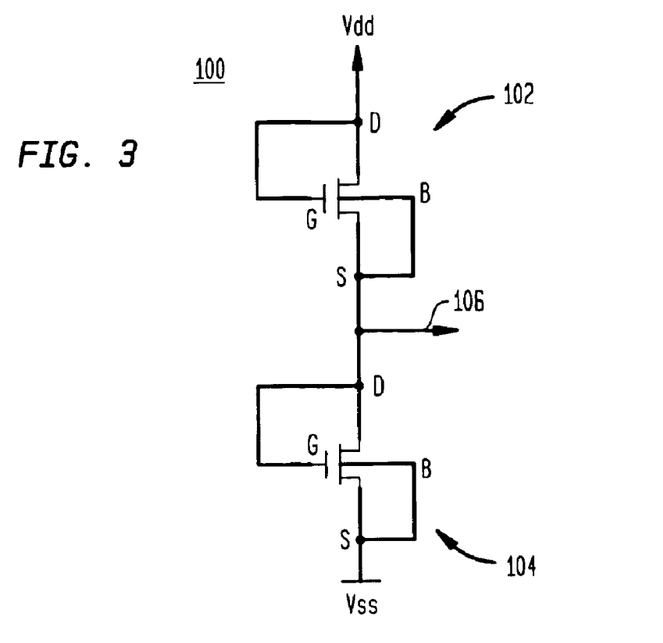
FIG. 3 is a circuit diagram of an active termination circuit in accordance with one or more aspect of the present invention.

Referring now to the drawings, wherein like numerals indicate like elements, there is shown in FIG. 3 an active termination circuit 100 in accordance with one or more aspects of the present invention. The active termination circuit 100 includes first and second N-channel MOSFETs 102, 104, respectively. Each N-channel MOSFET 102, 104 includes a gate terminal G, a drain terminal D, a source terminal S, and a bulk terminal B. The source terminal S and the bulk terminal B of the first N-channel MOSFET 102 are coupled to a common node 106, which is a termination node. The drain terminal D of the first N-channel MOSFET 102 is coupled to a Vdd node of a first source potential. By way of example, the Vdd node may provide 1.8 volts, 2.5 volts, 3.3 volts, etc. The source terminal S and the bulk terminal B of the second N-channel MOSFET 104 are coupled to a Vss node of a second source potential, such as ground. The drain terminal D is coupled to the common node 106. The respective gate terminals G of the first and second N-channel MOSFETs 102, 104 are coupled to their respective drain terminals D. This rudimentary control circuit operates to bias the first and second N-channel MOSFETs 102, 104 such that they exhibit a controlled impedance at the common node 106.

Figure 4:
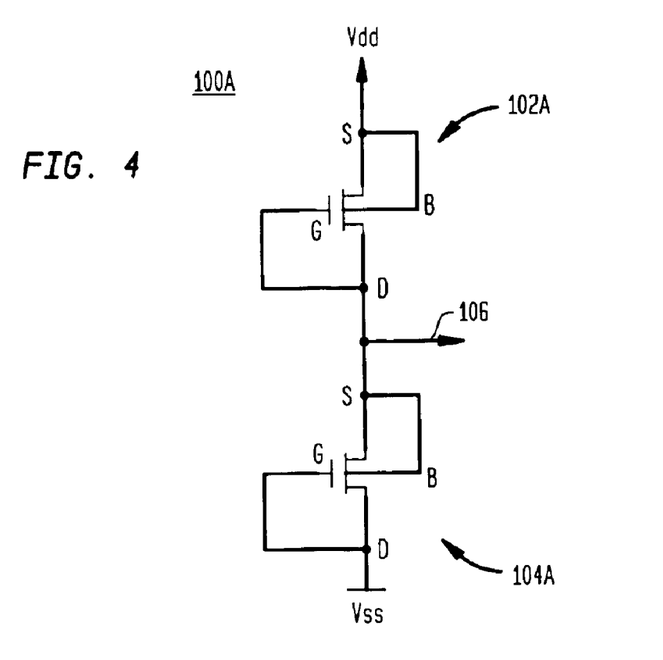
FIG. 4 is an alternative circuit diagram of an active termination circuit in accordance with one or more further aspects of the present invention.

FIG. 4 is a schematic diagram of an alternative active termination circuit 100A wherein first and second P-channel MOSFETs 102A and 104A are employed. For the purposes of brevity, a detailed description of the interconnections of the circuit 100A and its voltage and current characteristics will not be presented inasmuch as they are believed to be evident in light of the discussion hereinabove with respect to FIG. 3.

Figure 5:
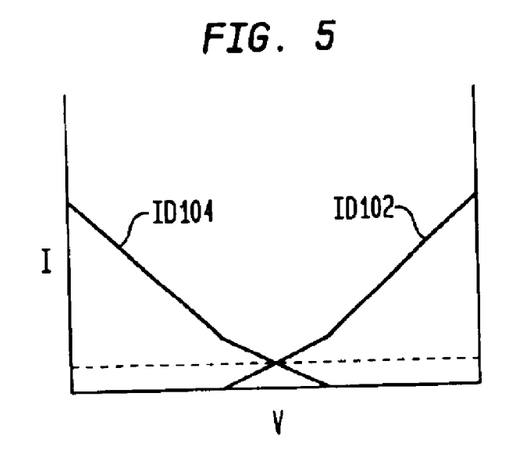
FIG. 5 is a graph illustrating the voltage and current characteristics of the components of the circuit of FIG. 3.

The voltage and current characteristics of the termination circuit 100 of FIG. 3 will now be discussed with reference to FIG. 5. Assuming that the first and second N-channel MOSFETs 102, 104 are matched, then a high impedance (or open) condition at the common node 106 will result in substantially equal currents through the drain-to-source terminals of the first and second N-channel MOSFETs 102, 104. As shown in FIG. 5, the voltage at the common node 106 at this bias point is about (Vdd−Vss)/2. The current level, i.e., the shunt current, Is, at this bias point has a magnitude substantially equal to the magnitude at which the respective drain currents ID102 and ID104 intersect. Advantageously, the shunt current Is is substantially less than the shunt current of the prior art resistive termination circuit 10 (FIG. 1). Indeed, the shunt current Is of the active termination circuit 100 of the present invention may be on the order of about 1 mA.

Figure 6:
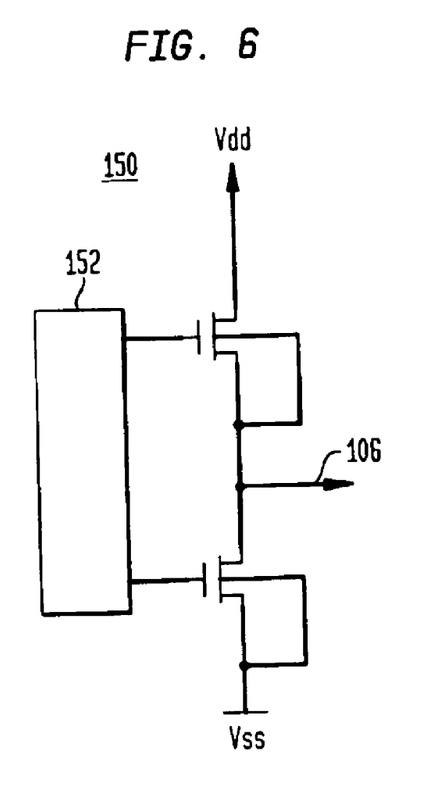
FIG. 6 is an alternative active termination circuit that provides additional design flexibility using a control circuit.

Reference is now made to FIG. 6, which is a block diagram of an alternative termination circuit 150 in accordance with one or more further aspects of the present invention. The circuit 150 includes the first and second N-channel MOSFETs 102, 104 as in the circuit 100 of FIG. 3. The termination circuit 150 also includes a control circuit 152 that is preferably operable to bias the MOSFETs 102, 104 such that a desirable quiescent voltage and a desirable impedance are exhibited at node 106.

Figure 7:
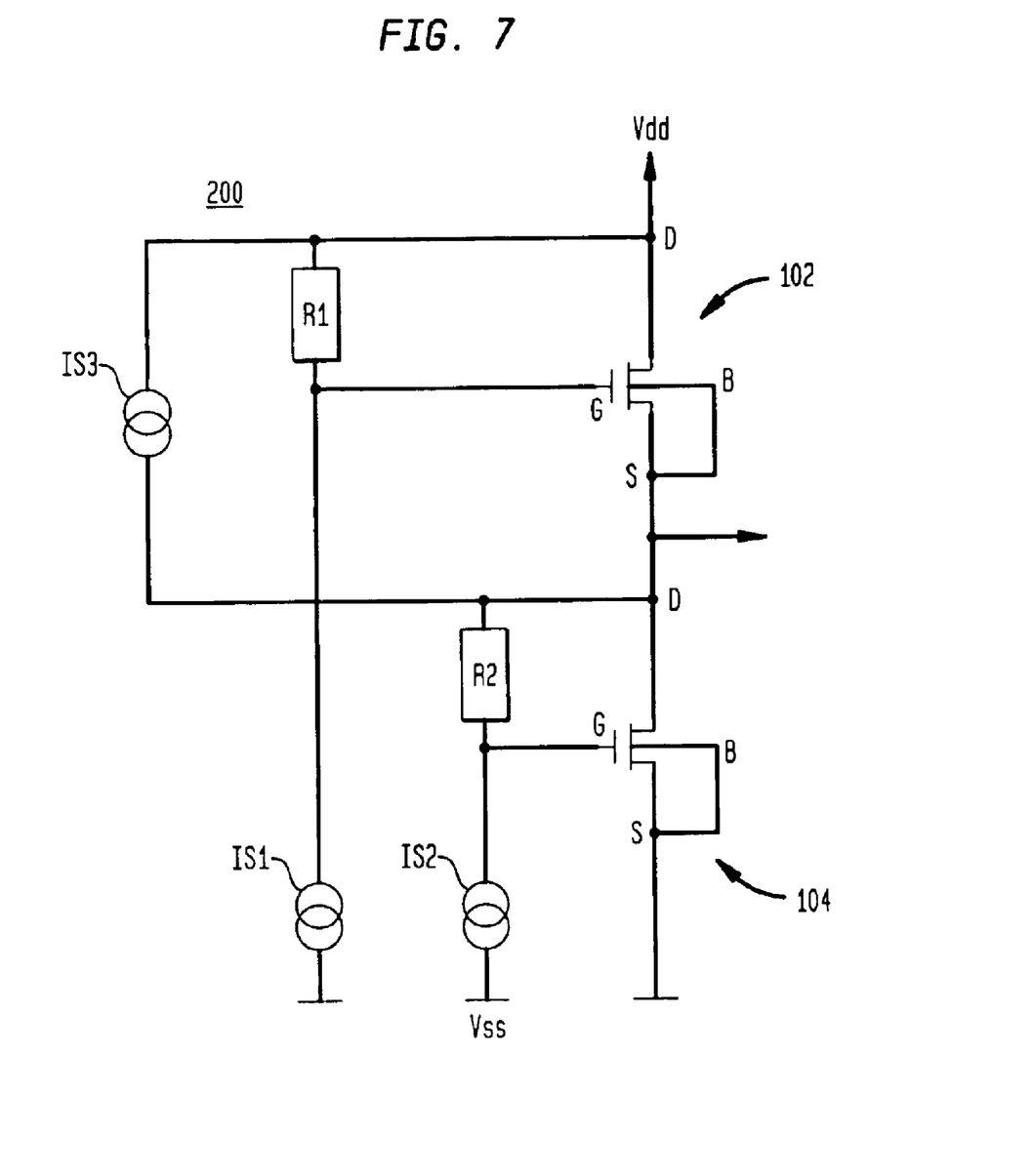
FIG. 7 is a schematic diagram of an active termination circuit suitable for implementing the circuit of FIG. 6.

Reference is now made to FIG. 7, which is a schematic diagram of an active termination circuit 200 in accordance with one or more further aspects of the present invention. Like the circuit of FIG. 6, the active termination circuit 200 includes first and second N-channel MOSFETs 102, 104, respectively. Each N-channel MOSFET 102, 104 includes a gate terminal G, a drain terminal D, a source terminal S, and a bulk terminal B. The source terminal S and the bulk terminal B of the first N-channel MOSFET 102 are coupled to a common node 106, which is a termination node. The drain terminal D of the first N-channel MOSFET 102 is coupled to a Vdd node of a first source potential. The source terminal S and the bulk terminal B of the second N-channel MOSFET 104 are coupled to a Vss node of a second source potential, such as ground. The drain terminal D is coupled to the common node 106.

The circuit 200 includes more details regarding a suitable control circuit to bias the MOSFETs 102, 104. In particular, the gate terminal G of the first N-channel MOSFET 102 is coupled to the Vdd node through a first impedance, such as resistor R1. A first current source IS1 is coupled between the junction of the resistor R1 and the gate terminal G of the first N-channel MOSFET 102 and the Vss node. The gate terminal G of the second N-channel MOSFET 104 is coupled to the common node 106 through a second impedance, such as resistor R2. A second current source IS2 is coupled between the junction of the resistor R2 and the gate terminal G of the second N-channel MOSFET 104 and the Vss node. A third current source IS3 is coupled between the Vdd node and the common node 106.

In comparison with the active termination circuit 100 of FIG. 3, the termination circuit 200 of FIG. 6 is compensated by way of the various components to substantially eliminate variations in supply voltages and temperature variations. In order to maintain current symmetry, the third current source IS3 compensates for the current drawn from the common node 106 by the second current source IS2.

In general, resistors R1 and R2, and current sources IS1, IS2, and IS3 operate to bias the first and second N-channel MOSFETs 102, 104 such that a quiescent voltage potential is produced at the common node 106 that is between the respective magnitudes of the Vdd and Vss nodes, while maintaining a controlled impedance, such as 75 Ohms. Preferably, the quiescent voltage potential is at about a midpoint between the magnitudes of the Vdd and Vss nodes. By way of example, the magnitude of the voltage at the Vdd node may be about 1.8 volts, while the magnitude at the Vss node may be about 0 volts. Thus, the quiescent voltage potential of the common node 106 is preferably about 0.9 volts.

Preferably, the first, second, and third current sources IS1, IS2, and IS3 are voltage controllable to produce respective currents in response to a current command signal, wherein the respective magnitudes of the currents function to control the impedance and quiescent voltage potential at the common node 106.

Figure 8:
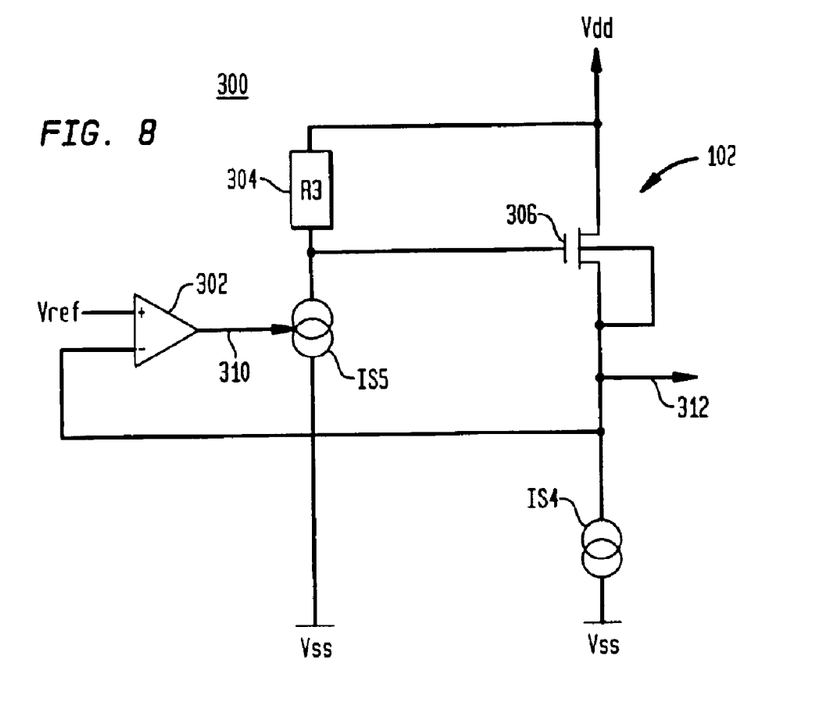
FIG. 8 is a schematic diagram of a circuit that is operable to produce one or more control voltages that may be employed to control one or more current sources of the circuit of FIG. 7.

FIG. 8 is schematic diagram of a circuit that is suitable for producing a voltage that may be used to command or control the magnitudes of the respective currents produced by the first, second, and third current sources IS1, IS2, and IS3 of the termination circuit 200 of FIG. 7. The control circuit 300 includes an operational amplifier 302, a third impedance 304 (such as resistor R3), a transistor 306, a fourth current source IS4, and a fifth current source IS5. An output voltage may be taken from either or both of nodes 310 and 312. The operational amplifier 302 preferably receives a reference voltage Vref as input to its non-inverting node and receives a voltage from the output node 312 as input to its inverting input. Preferably, the fifth current source IS5 is a voltage controlled current source and receives its control voltage from node 310, which is the output from the operational amplifier 302. The fifth current source IS5 draws a current through the resistor R3 and develops a particular voltage at the drive terminal of the transistor 306. Preferably, the transistor 306 is an N-channel MOSFET, which draws a drain current from the Vdd node in response to the voltage drop across resistor R3. This establishes a voltage potential at node 312 and at the inverting input terminal of the operational amplifier 302, thereby completing the control loop. Preferably, an output voltage is taken from node 310 and is applied as a control voltage to one or more of the first, second, and third voltage controlled current sources IS1, IS2, and IS3, respectively. As discussed above, an output voltage may alternatively be taken at node 312.

Preferably, the ratio of Vref and the magnitude of the current drawn by the fourth current source IS4 is substantially equal to the controlled impedance at the common node 106 of the termination circuit 200 (FIG. 7). Preferably, the transistor 306 is a scaled version of the first and second N-channel MOSFETs 102, 104 of the termination circuit 200 and the magnitude of the current drawn by the fourth current source IS4 is a corresponding scaled version of the desired current to be drawn by the first, second, and third voltage controlled current sources IS1, IS2, and IS3.

Figure 9:
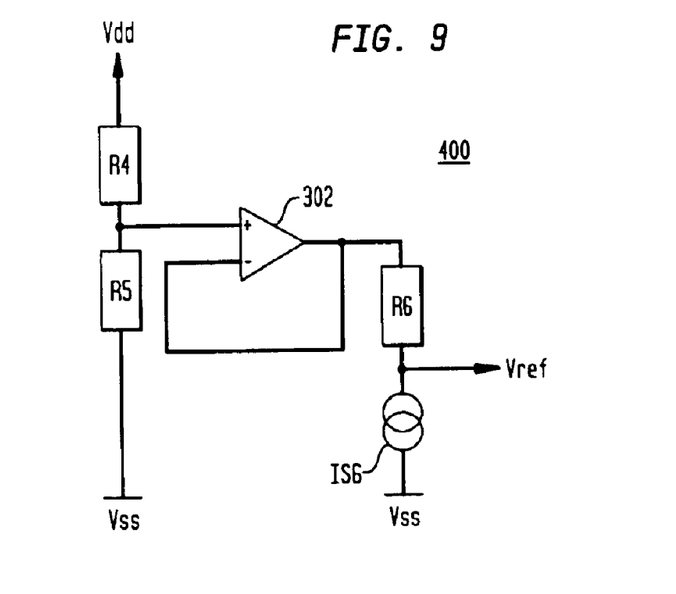
FIG. 9 is a schematic diagram of a circuit that is operable to produce a reference voltage for the circuit of FIG. 8.

The voltage Vref may be produced by way of the exemplary circuit 400 of FIG. 9. The circuit 400 includes resistors R4, R5, and R6, operational amplifier 402, and a sixth current source IS6. Resistors R4 and R5 are coupled as a voltage divider between the Vdd node and the Vss node. Preferably, this resistor divider produces a voltage of about (Vdd−Vss)/2, which is input into the non-inverting input terminal of the operational amplifier 402. The operational amplifier 402 is connected in a voltage follower configuration. The output voltage of the operational amplifier 402, which is substantially equal to the voltage produced by the voltage divider, is used to drive a series combination of the resistor R6 and the sixth current source IS6. The control voltage Vref is preferably taken across the sixth current source IS6. Through careful trimming of resistor R6, a very accurate magnitude for Vref may be achieved.

Figure 10:
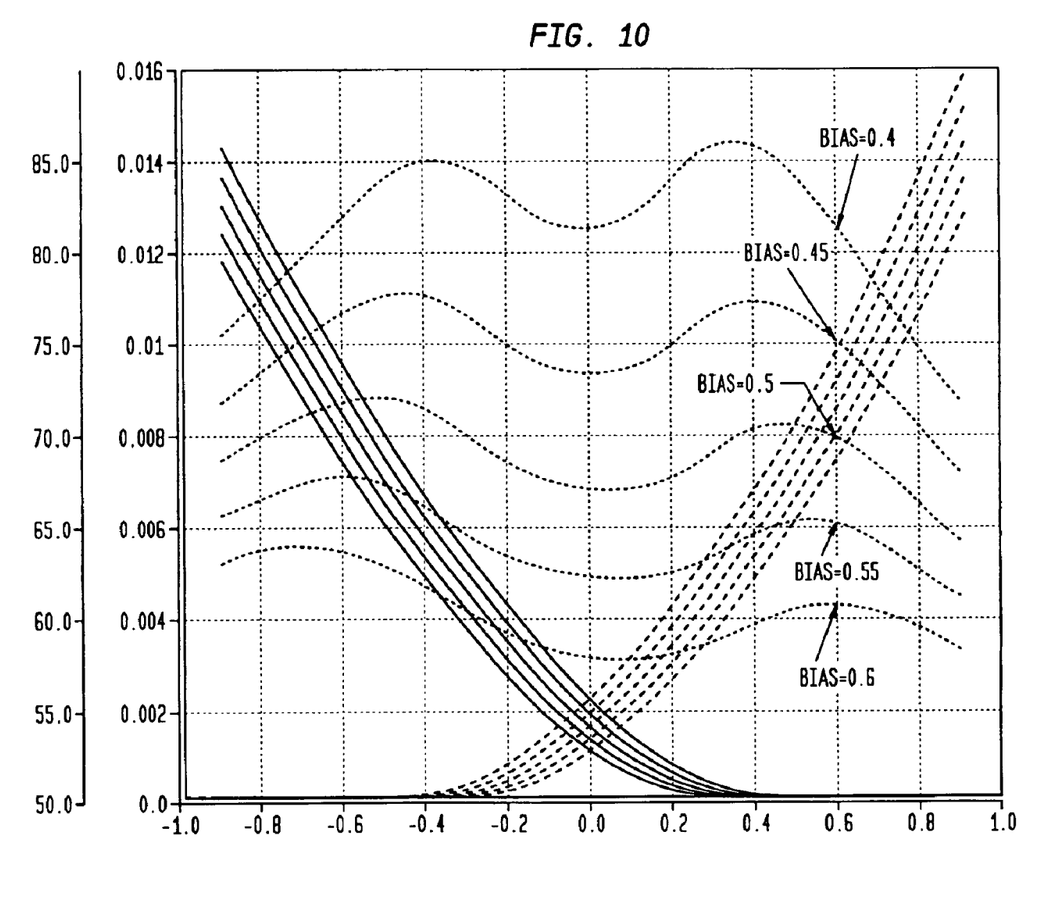
FIG. 10 is a graph illustrating impedance, current, and voltage characteristics of the termination circuit of FIG. 7.

Advantageously, desirable impedance, current, and voltage characteristics of the termination circuit 200 (FIG. 7) are achieved utilizing the control circuit formed by the components of FIGS. 7–9. These characteristics will now be discussed with reference to FIG. 10. FIG. 10 is a multi-ordinate and single abscissa Cartesian coordinate graph showing the impedance (Ohms) along the left most ordinate axis, and the currents ID102, ID104 drawn by the respective first and second N-channel MOSFETs 102, 104 along the next ordinate axis. The voltage of the common node 106 (whether induced by a driver circuit or quiescent) is plotted along the abscissa. Position (or voltage) 0.0 indicates a point of quiescence, whereby no voltage is induced on the common node 106 by way of a driver circuit. As can be seen by the graph, various impedances at the common node 106 may be achieved by selecting different bias conditions for the first and second N-channel MOSFETs 102, 104. In particular, differing gate-to-drain voltages for the first N-channel MOSFET 102 will establish differing impedances at the common node 106. Thus, selection of the impedance of the resistor R1 and the magnitude of the current of the first current source IS1 will establish the impedance at the common node 106. By way of example, a gate-to-drain voltage of about 0.45 volts results in a nominal impedance of about 75 Ohms at the common node 106. Of course, other impedances may be achieved as desired.

Figure 11:
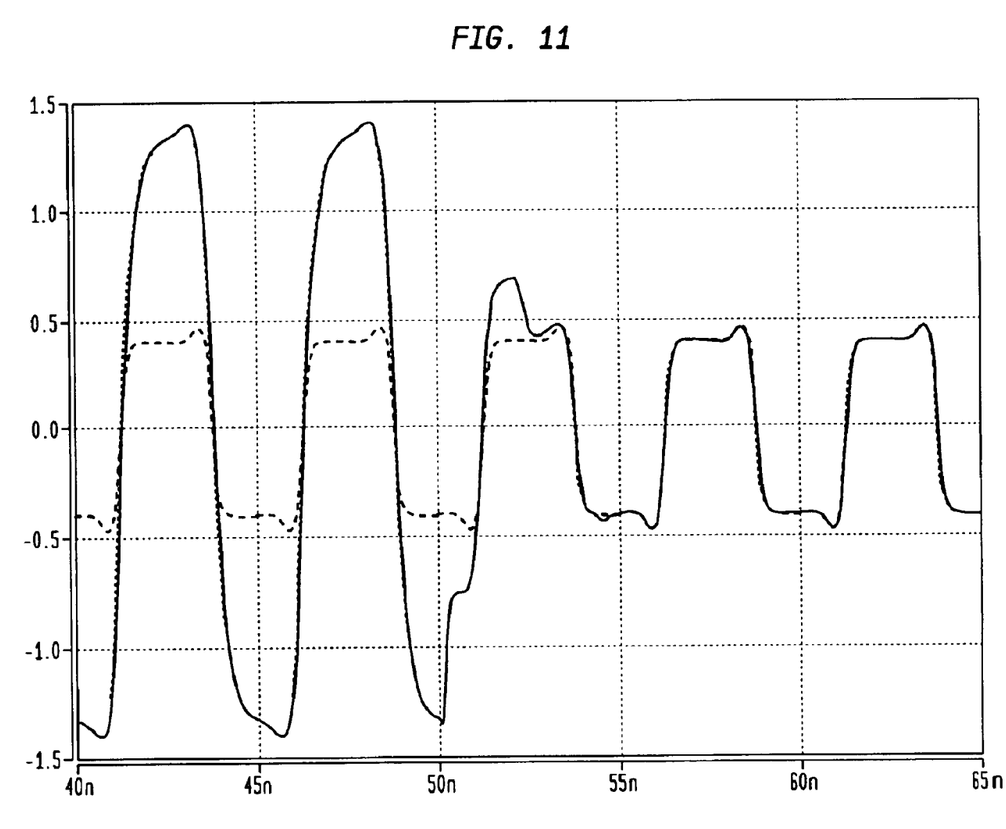
FIG. 11 is a graphical illustration comparing voltage versus time characteristics of the prior art resistive termination circuit as compared with a non-activated and an activated termination circuit in accordance with the present invention.

Reference is now made to FIG. 11, which is a graphical illustration of the voltage versus time characteristics of the active termination circuit 200 (FIG. 7) of the instant application as compared with the resistive termination (FIG. 1) of the prior art. In particular, FIG. 11 plots voltage along the ordinate axis and time along the abscissa. The plotted waveforms correspond to the voltages induced on the termination node, the common node in FIG. 1 and node 106 in FIG. 6. More particularly, the voltage curve in dashed line represents the voltage versus time characteristic of the termination node of the prior art resistive termination circuit 10 of FIG. 1. The solid line plot represents the voltage versus time characteristic of the termination node 106 of the active termination circuit 200 of FIG. 7.

The ordinate axis is labeled 0.0 volts at a quiescent point, which may actually represent a voltage of about (Vdd–Vss)/2. The voltage waveform induced on the termination node of the prior resistive termination circuit (shown in dashed line) is basically a square wave having a magnitude of 0.350 volts at a frequency of about 200 Mhz. The plot of the voltage characteristic of the termination node 106 of the active termination circuit 200 of FIG. 7 differs substantially between about 40 ns and 55 ns. This is so because that portion of the graph illustrates the voltage characteristic when the N-channel MOSFETs 102, 104 are deactivated. At a time of about 50 ns, the N-channel MOSFETs 102, 104 are activated and within about 2.5 ns, the voltage characteristic of the active termination circuit 200 substantially matches the voltage characteristic of the resistive termination circuit 10 of the prior art. It is noted, however, that the current drawn by the active termination circuit 200 of the instant invention is advantageously smaller than the current drawn by the resistive termination circuit 10 of the prior art.

Figure 12:
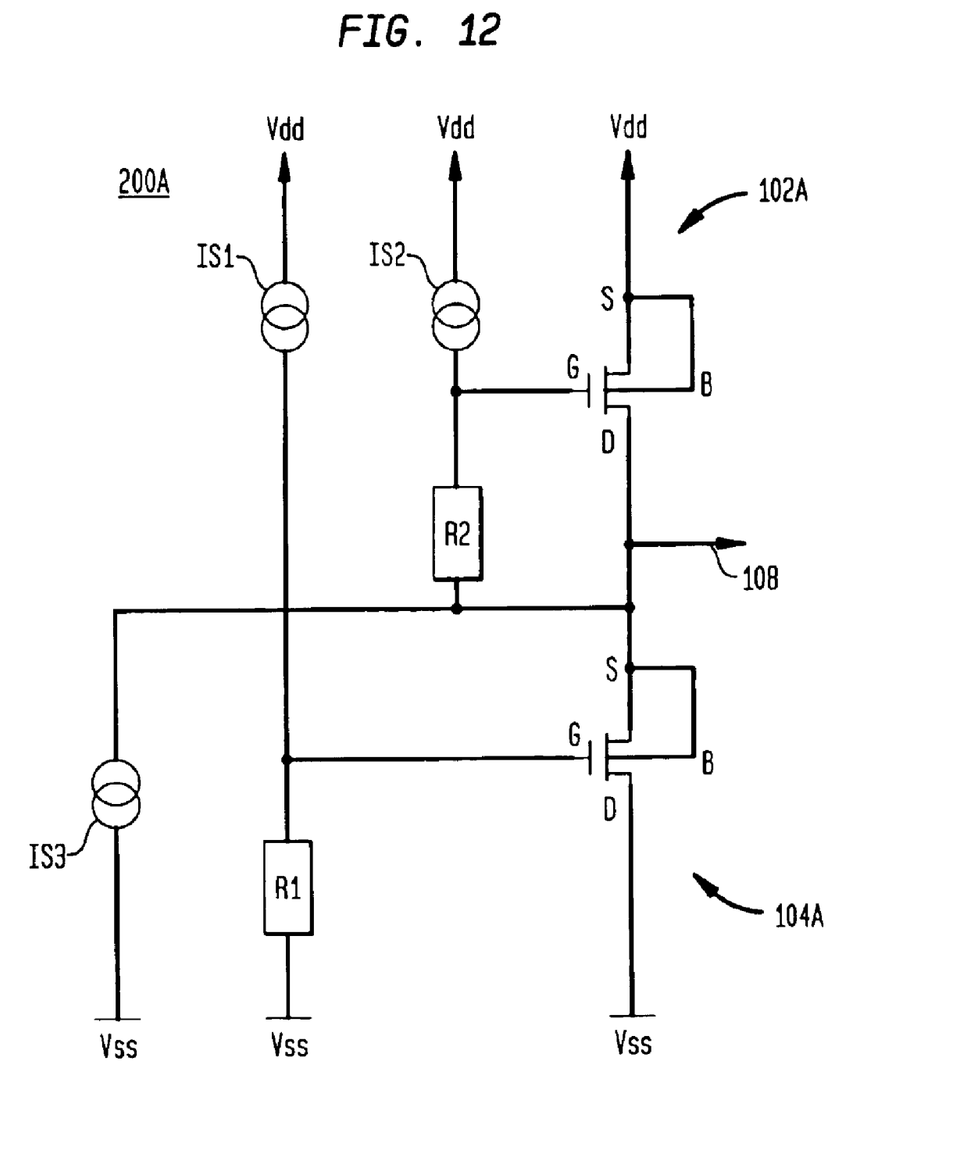
FIG. 12 is an alternative active termination circuit that is analogous to the circuit of FIG. 7 except that it employs P-channel MOSFETS.

Reference is now made to FIG. 12, which is a schematic diagram of an alternative active termination circuit 200A, which employs first and second P-channel MOSFETs 102A and 104A, respectively. Each P-channel MOSFET 102A, 104A includes a gate terminal G, a drain terminal D, a source terminal S, and a bulk terminal B. The source terminal S and the bulk terminal B of the first P-channel MOSFET 102A are coupled to the Vss node. The drain terminal D of the first P-channel MOSFET 102A is coupled to the source terminal S and the bulk terminal B of the second P-channel MOSFET 104A, which is the termination node 106. The drain terminal D of the second P-channel MOSFET 104A is coupled to the Vss node. As with the circuit 200 of FIG. 7, the active termination circuit 200A of FIG. 12 includes a control circuit to bias the first and second P-channel MOSFETs 102A, 104A in such as a way as to compensate for variations in the supply voltages and temperature variations. The gate terminal G of the first P-channel MOSFET 102A is coupled to the Vdd node by way of a second current source IS2, and is coupled to the common node 106 by way of a resistor R2. The gate terminal G of the second P-channel MOSFET 104A is coupled to the Vdd node by way of a first current source IS1, and is coupled to the Vss node by way of a resistor R1. A third current source IS3 is coupled between the Vss node and the common node 106.

In general, resistors R1 and R2 and current sources IS1, IS2, and IS3 operate to bias the first and second P-channel MOSFETs 102A, 104A such that a quiescent voltage potential is produced at the common node 106A that is between the respective magnitudes of the Vdd and Vss node, while maintaining a controlled impedance, such as 75 Ohms. As with previous embodiments of the invention, the quiescent voltage potential of the active termination circuit 200A is preferably about a midpoint between the magnitudes of the Vdd and Vss nodes.

Preferably the first, second, and third current sources IS1, IS2, and IS3 are voltage controllable to produce respective currents in response to a current command signal, wherein the respective magnitudes of the currents function to control the impedance and quiescent voltage potential at the common node 106A. The circuit of FIG. 8 is suitable for producing a voltage that may be used to command or control the magnitudes of the respective currents produced by IS1, IS2, and IS3. For the purposes of brevity, the voltage, current, and impedance characteristics illustrated in FIGS. 10 and 11 may readily be achieved utilizing the circuit of FIG. 12 as will be apparent to one skilled in the art from the description of previous embodiments of the invention hereinabove.

Figure 13:
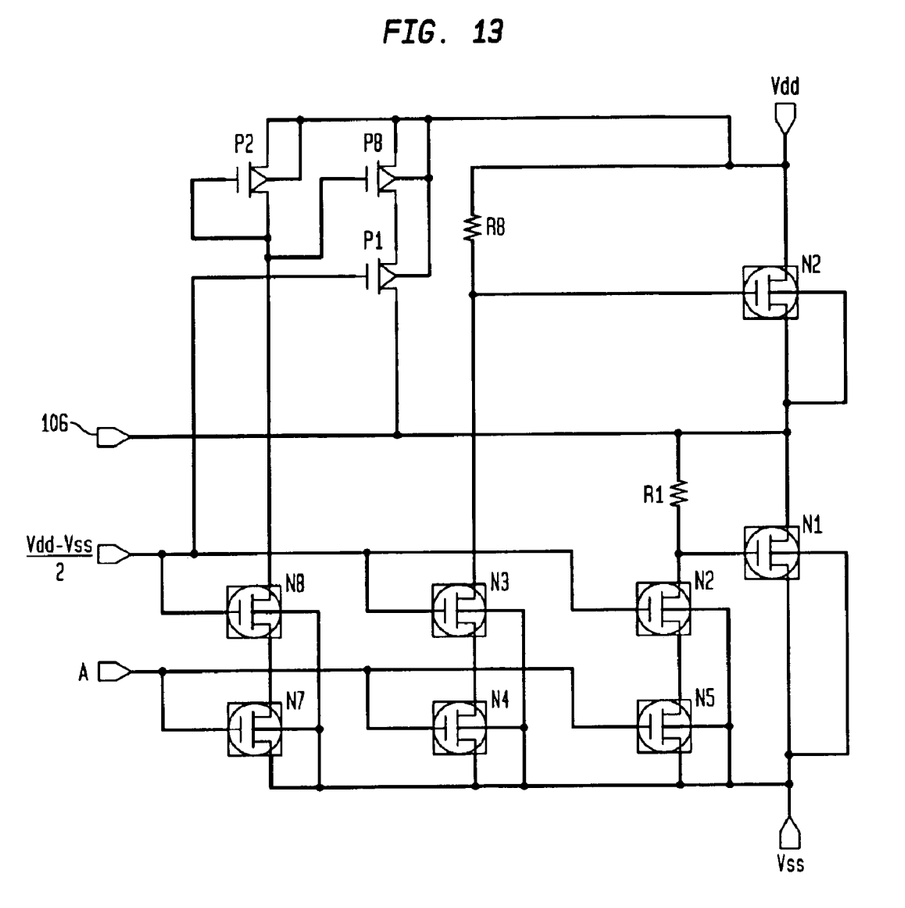
FIG. 13 is a more detailed schematic diagram of the termination circuit of FIG. 7.
Figure 14:
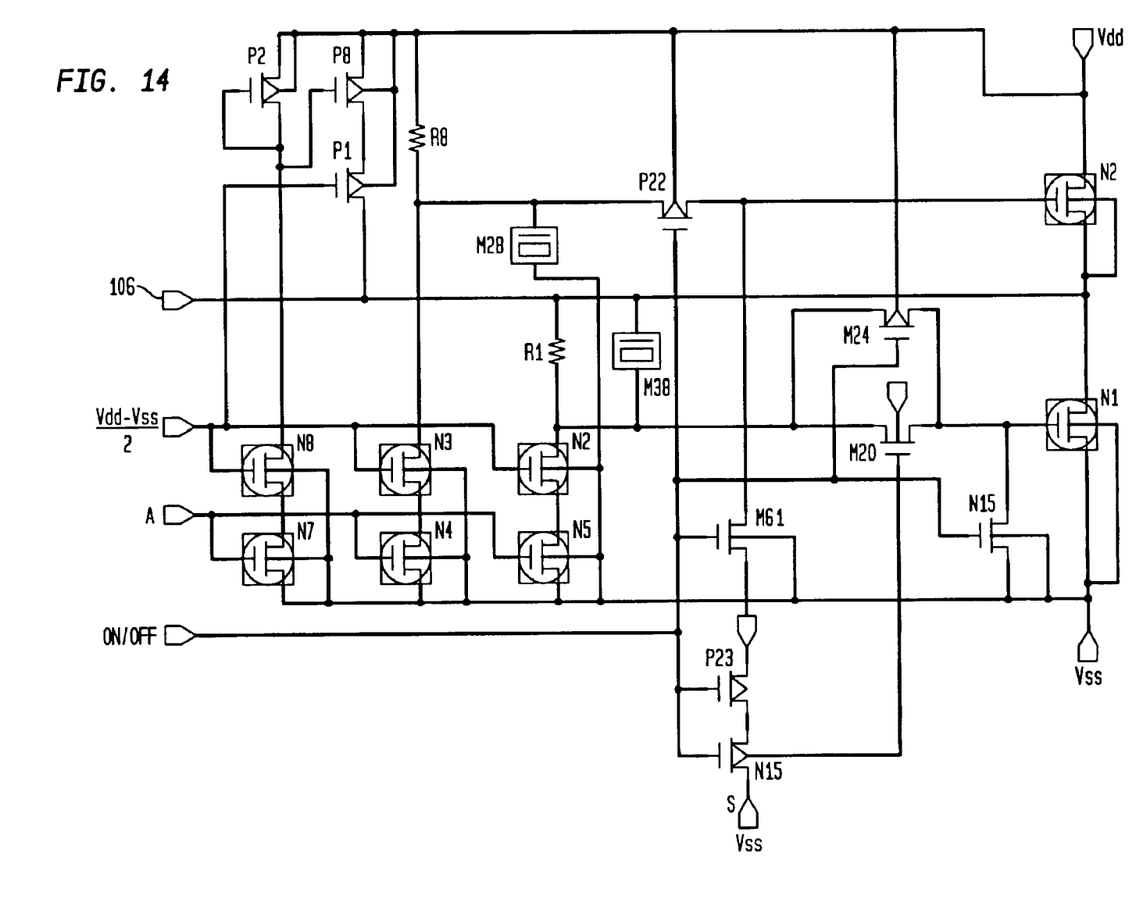
FIG. 14 is an alternative detailed schematic diagram suitable for use in implementing the termination circuit of FIG. 7.
Figure 15:
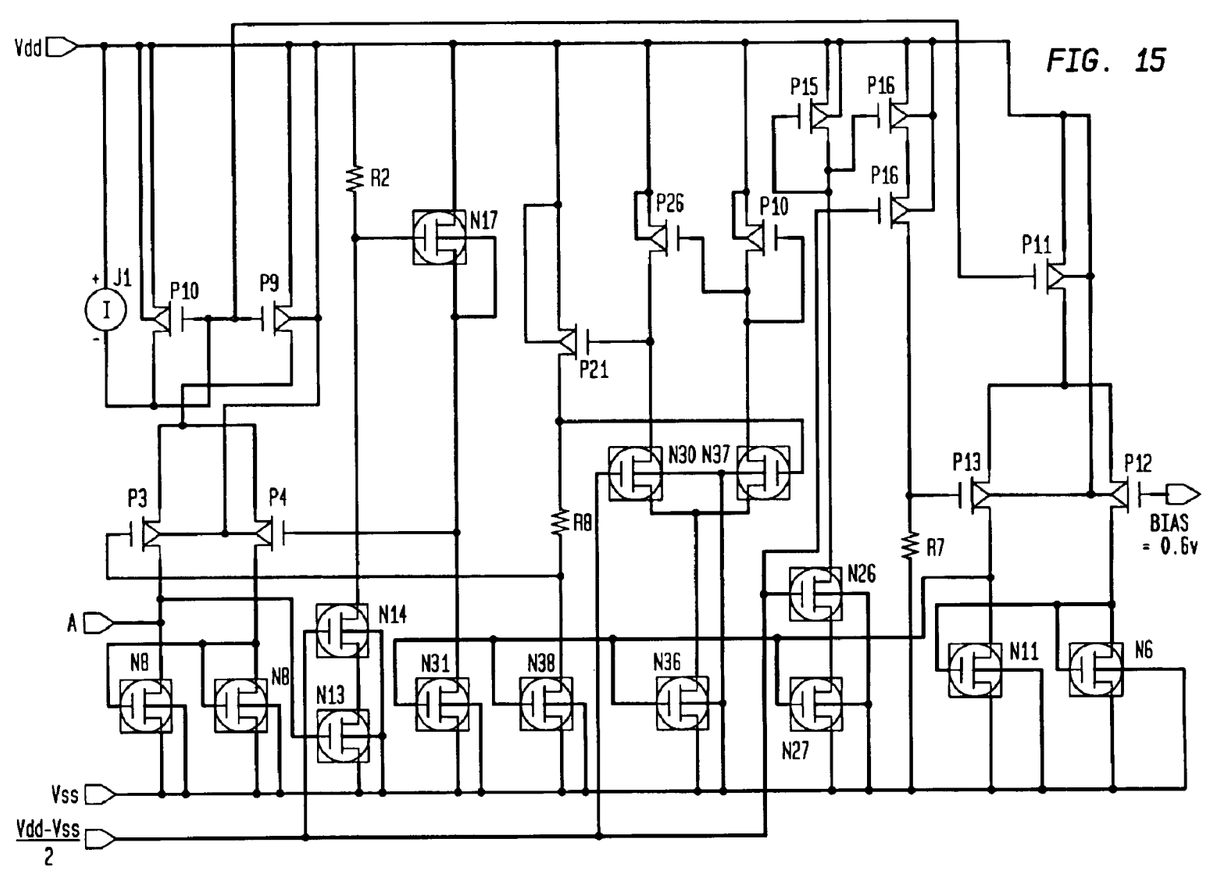
FIG. 15 is a more detailed schematic diagram suitable for use in implementing the circuits of FIGS. 8 and 9 in combination.

Reference is now made to FIG. 13, which is a schematic diagram of a more detailed circuit that may be used to implement the termination circuit 200 of FIG. 7. For the purposes of brevity and clarity a detailed description of each and every component of the circuit of FIG. 13 and their interconnections will be omitted. FIG. 14 is a schematic diagram of an alternative implementation of the circuits of FIG. 7 and FIG. 13. FIG. 15 is a detailed schematic diagram suitable for implementing the control circuitry of FIGS. 8 and 9. Again, for the purposes of brevity, a detailed description of each and every element of this schematic and their interconnections will be omitted inasmuch as such information will be apparent to one skilled in the art from the discussion hereinabove.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An integrated circuit, comprising:
   at least one main circuit operable to perform one or more functions, and including at least one I/O node for receiving or transmitting an operating signal;
   an active termination circuit having first and second MOSFETs of the same type directly connected to each other in series across a Vdd node of a first source potential and a Vss node of a second source potential, the at least one I/O node being coupled to a common node between the first and second MOSFETs; and a control circuit operable to bias the first and second MOSFETs such that they exhibit a controlled impedance at the common node.

2. The integrated circuit of claim 1, wherein the first and second MOSFETs are of the N-channel type.

3. The integrated circuit of claim 1, wherein the first and second MOSFETs are of the P-channel type.

4. An integrated circuit, comprising:

at least one main circuit operable to perform one or more functions, and including at least one I/O node for receiving or transmitting an operating signal;

an active termination circuit having first and second MOSFETs of the same type coupled in series across a Vdd node of a first source potential and a Vss node of a second source potential, the at least one I/O node being coupled to a common node between the first and second MOSFETs; and a control circuit operable to bias the first and second MOSFETs such that they exhibit a controlled impedance at the common node;

the control circuit including a first gate control circuit operable to provide a first gate drive signal to a gate of the first MOSFET, and a second gate control circuit operable to provide a second gate drive signal to a gate of the second MOSFET; and the first and second gate drive signals being such that a quiescent voltage potential of the common node is between the Vdd and Vss potentials.

5. The integrated circuit of claim 4, wherein the quiescent voltage potential of the common node is at about a midpoint between the Vdd and Vss potentials.

6. The integrated circuit of claim 5, wherein the quiescent voltage potential of the common node is substantially non-zero.

7. The integrated circuit of claim 4, wherein:

the first gate control circuit includes a first impedance coupled between the gate and a drain of the first MOSFET and a first current source coupled from the gate of the first MOSFET to the Vss node;

the second control circuit includes a second impedance coupled between the gate and a drain of the second MOSFET and a second current source coupled from the gate of the second MOSFET to the Vss node;

the control circuit includes a third current source coupled between the Vdd node and the common node; and respective magnitudes of the first, second, and third current sources are controlled to achieve the controlled impedance and the quiescent voltage potential at the common node.

8. The integrated circuit of claim 7, wherein the first, second, and third current sources are voltage controllable and produce respective currents in response to a current command signal to achieve the controlled impedance and the quiescent voltage potential at the common node.

9. The integrated circuit of claim 8, wherein the control circuit further includes a scaled MOSFET coupled in series with a fourth current source from the Vdd node to the Vss node, a third impedance coupled from a drain to a gate of the scaled MOSFET, a fifth voltage controlled current source receiving the current command signal and being coupled from the gate of the scaled MOSFET to the Vss node, and an operational amplifier operable to produce the current command signal based on a reference voltage and a voltage at a source of the scaled MOSFET.

10. The integrated circuit of claim 9, wherein a ratio of the magnitude of the reference voltage and the magnitude of the fourth current source is substantially the controlled impedance at the common node.

11. The integrated circuit of claim 9, wherein the scaled MOSFET is a scaled version of the first MOSFET.

12. The integrated circuit of claim 9, wherein:

the control circuit includes a voltage source operable to produce about ½ of the voltage potential between the Vdd and Vss nodes, and a reference resistor coupled from the voltage source to a sixth current source; and the reference voltage is taken at a junction of the reference resistor and the sixth current source.

13. The integrated circuit of claim 4, wherein the first and second MOSFETs are of the N-channel type.

14. The integrated circuit of claim 4, wherein the first and second MOSFETs are of the P-channel type.

15. An active signal termination circuit, comprising:

a first N-channel MOSFET having a gate terminal, a drain terminal, a source terminal, and a bulk terminal, the source terminal and the bulk terminal being directly connected to a common node, and the drain terminal being coupled to a Vdd node of a first source potential;

a second N-channel MOSFET having a gaze terminal, a drain terminal, a source terminal, and a bulk terminal, the source terminal and the bulk terminal being directly connected to a Vss node of a second source potential, and the drain terminal being coupled to the common node; and a control circuit operable to bias the first and second MOSFETs such that they exhibit a controlled impedance at the common node.

16. An active signal termination circuit comprising:

a first N-channel MOSFET having a gate terminal, a drain terminal, a source terminal, and a bulk terminal, the source terminal and the bulk terminal being coupled to a common node, and the drain terminal being coupled to a Vdd node of a first source potential;

a second N-channel MOSFET having a gate terminal, a drain terminal, a source terminal, and a bulk terminal, the source terminal and the bulk terminal being coupled to a Vss node of a second source potential, and the drain terminal being coupled to the common node; and a control circuit operable to bias the first and second MOSFETs such that they exhibit a controlled impedance at the common node, wherein the control circuit comprises:

a first gate control circuit including a first impedance coupled between the gate terminal and the drain terminal of the first N-channel MOSFET and a first current source coupled from the gate terminal of the first N-channel MOSFET to the Vss node;

a second control circuit including a second impedance coupled between the gate terminal and the drain terminal of the second N-channel MOSFET and a second current source coupled from the gate terminal of the second N-channel MOSFET to the Vss node; and a third current source coupled between the Vdd node and the common node;

wherein respective magnitudes of the first, second, and third current sources are controlled to achieve the controlled impedance and the quiescent voltage potential at the common node.

17. The circuit of claim 16, wherein the first, second, and third current sources are voltage controllable and produce respective currents in response to a current command signal to achieve the controlled impedance and the quiescent voltage potential at the common node.

18. The circuit of claim 17, wherein the control circuit further includes a scaled MOSFET coupled in series with a fourth current source from the Vdd node to the Vss node, a third impedance coupled from a drain to a gate of the scaled MOSFET, a fifth voltage controlled current source receiving the current command signal and being coupled from the gate of the scaled MOSFET to the Vss node, and an operational amplifier operable to produce the current command signal based on a reference voltage and a voltage at a source of the scaled MOSFET.

19. The circuit of claim 18, wherein a ratio of the magnitude of the reference voltage and the magnitude of the fourth current source is substantially the controlled impedance at the common node.

20. The circuit of claim 18, wherein the scaled MOSFET is a scaled version of the first N-channel MOSFET.

21. The circuit of claim 18, wherein:
the control circuit includes a voltage source operable to produce about ½ of the voltage potential between the Vdd and Vss nodes, and a reference resistor coupled from the voltage source to a sixth current source; and
the reference voltage is taken at a junction of the reference resistor and the sixth current source.

22. An active signal termination circuit, comprising:
a first P-channel MOSFET having a gate terminal, a drain terminal, a source terminal, and a bulk terminal, the source terminal and the bulk terminal being directly connected to a Vdd node of a first source potential, and the drain terminal being coupled to a common node;
a second P-channel MOSFET having a gate terminal, a drain terminal, a source terminal, and a bulk terminal, the source terminal and the bulk terminal being directly connected to the common node, and the drain terminal being coupled to a Vss node of a second source potential; and
a control circuit operable to bias the first and second MOSFETs such that they exhibit a controlled impedance at the common node.

23. An active signal termination circuit, comprising:
a first P-channel MOSFET having a gate terminal, a drain terminal, a source terminal, and a bulk terminal, the source terminal and the bulk terminal being directly connected to a Vdd node of a first source potential, and the drain terminal being coupled to a common node;
a second P-channel MOSFET having a gate terminal, a drain terminal, a source terminal, and a bulk terminal, the source terminal and the bulk terminal being directly connected to the common node, and the drain terminal being counted to a Vss node of a second source potential; and
a control circuit operable to bias the first and second MOSFETs such that they exhibit a controlled impedance at the common node, wherein the control circuit comprises:

a first gate control circuit including a first impedance coupled between the gate terminal and the drain terminal of the second P-channel MOSFET and a first current source coupled from the gate terminal of the second P-channel MOSFET to the Vdd node;
a second control circuit including a second impedance coupled between the gate terminal and the drain terminal of the first P-channel MOSFET and a second current source coupled from the gate terminal of the first P-channel MOSFET to the Vdd node; and
a third current source coupled between the Vss node and the common node,
wherein respective magnitudes of the first, second, and third current sources are controlled to achieve the controlled impedance and the quiescent voltage potential at the common node.

24. The circuit of claim 23, wherein the first, second, and third current sources are voltage controllable and produce respective currents in response to a current command signal to achieve the controlled impedance and the quiescent voltage potential at common node.

25. The circuit of claim 24, wherein the control circuit further includes a scaled MOSFET coupled in series with a fourth current source from the Vdd node to the Vss node, a third impedance coupled from a drain to a gate of the scaled MOSFET, a fifth voltage controlled current source receiving the current command signal and being coupled from the gate of the scaled MOSFET to the Vss node, and an operational amplifier operable to produce the current command signal based on a reference voltage and a voltage at a source of the scaled MOSFET.

26. The circuit of claim 25, wherein a ratio of the magnitude of the reference voltage and the magnitude of the fourth current source is substantially the controlled impedance at the common node.

27. The circuit of claim 25, wherein the scaled MOSFET is a scaled version of the first P-channel MOSFET.

28. The circuit of claim 25, wherein:
the circuit includes voltage source operable to produce about ½ of the voltage potential between the Vdd and Vss nodes, and a reference resistor coupled from the voltage source to a sixth current source; and
the reference voltage is taken at a junction of the reference resistor and the sixth current source.

29. A method, comprising biasing first and second series coupled MOSFETs of the same type such that they exhibit a controlled impedance at a common node thereof, wherein the first and second MOSFETs are directly connected to each other in series across a Vdd node of a first source potential and a Vss node of a second source potential, the common node being between the first and second MOSFETs.

30. The method of claim 29, wherein the first and second MOSFETs are of the N-channel type.

31. The method of claim 29, wherein the first and second MOSFETs are of the P-channel type.

* * * * *

UNITED STATES PATENT AND TRADEMARK OFFICE
CERTIFICATE OF CORRECTION

PATENT NO. : 6,937,058 B2
DATED : August 30, 2005
INVENTOR(S) : Viehmann et al.

Page 1 of 1

It is certified that error appears in the above-identified patent and that said Letters Patent is hereby corrected as shown below:

Column 9,
Line 62, delete "filth" insert -- fifth --.

Column 10,
Line 25, delete "gaze" insert -- gate --.
Line 34, delete "circuit comprising" insert -- circuit, comprising --.

Column 11,
Line 53, delete "counted" insert -- coupled --.

Column 12,
Line 22, delete "at common" insert -- at the common --.
Line 41, delete "the circuit" insert -- the control circuit --.
Line 41, delete "includes voltage" insert -- includes a voltage --.

Signed and Sealed this

Twenty-second Day of November, 2005

JON W. DUDAS
*Director of the United States Patent and Trademark Office*